United States Patent [19]

Schwenninger et al.

[11] 3,957,475
[45] May 18, 1976

[54] MEASURING GLASS SURFACE TEMPERATURE DURING ANNEALING

[75] Inventors: Ernest N. Schwenninger, Cumberland, Md.; Wright M. Welton, Jr., Paw Paw, W. Va.

[73] Assignee: PPG Industries, Inc., Pittsburgh, Pa.

[22] Filed: Apr. 7, 1975

[21] Appl. No.: 565,328

[52] U.S. Cl. .................................. 65/29; 65/158; 65/95; 65/97; 65/162; 65/194; 73/351
[51] Int. Cl.² .......................................... C03B 25/04
[58] Field of Search ............... 65/29, 158, 95, 162, 65/97, 194; 73/351

[56] References Cited
UNITED STATES PATENTS

| | | | |
|---|---|---|---|
| 1,753,743 | 4/1930 | Drake | 65/95 |
| 2,696,116 | 12/1954 | Tarr | 73/351 |
| 2,774,190 | 12/1956 | Atkeson | 65/95 |
| 3,309,236 | 3/1967 | Gunji | 73/351 |
| 3,511,627 | 5/1970 | Flori | 65/162 |
| 3,794,477 | 2/1974 | Farabaugh et al. | 65/158 |

*Primary Examiner*—Arthur D. Kellogg
*Attorney, Agent, or Firm*—Edward I. Mates

[57] ABSTRACT

Method and apparatus for continually monitoring the surface temperature of a moving glass ribbon at a given distance from the edge of the ribbon where the ribbon moves through a critical portion of an annealing lehr where the rate of cooling determines whether the ribbon may be cut easily after annealing and whether the ribbon is subjected to spontaneous breakage during annealing.

7 Claims, 5 Drawing Figures

MEASURING GLASS SURFACE TEMPERATURE DURING ANNEALING

BACKGROUND OF THE INVENTION

The present invention relates to the annealing of a newly formed glass ribbon and particularly relates to a method and apparatus for sensing the temperature at a critical portion of the cooling cycle at which the ease of cutting the ribbon and the likelihood of glass breakage is determined. The present invention is particularly useful to monitor the temperature of a moving ribbon of float glass in the region of the ribbon that is usually trimmed from the ribbon to produce blanks of commercially acceptable glass from the ribbon.

In the past, glass surface temperature measurements during annealing have been performed by thermocouples or temperature sensing elements spaced from the glass surface. Using temperature sensing elements spaced from the glass surface avoided scratching of the glass surfaces. However, other problems such as the sensing of extraneous radiation not associated with the temperature of the glass being monitored tended to cause errors in the sensed temperature.

Typical examples of patents providing non-contacting temperature sensing devices for moving glass ribbons are U.S. Pat. No. 2,912,862 to Machler et al and U.S. Pat. No. 3,600,947 to Farabaugh.

U.S. Pat. No. 3,500,548 to Mitsuno discloses the use of a pair of graphite electrodes positioned within a ribbon forming apparatus and adapted to contact the edge portion of a newly formed ribbon for the purpose of determining the presence or absence of the edge at an inspection station in a method of detecting and measuring the width of the ribbon as it passes the detection station. When the ribbon is narrower than the range of width to be detected, the electrodes do not contact any glass ribbon. When the ribbon width is greater, an edge portion of the ribbon is in contact with one or both of the electrodes mounted for contact by the ribbon edge portion. However, the edge detection apparatus of the Mitsuno patent is not used for determination of temperature at the ribbon edge.

SUMMARY OF THE INVENTION

The present invention involves determining the temperature of the ribbon along a line of movement at a given distance transversely inward from the edge of the ribbon when the ribbon is cooling through a critical range of temperatures. The line of movement is laterally outside a line along which the ribbon is to be cut along its length after the ribbon is annealed and usually represents a portion of the ribbon that would otherwise be unused, except perhaps as cullet, particularly when the ribbon is of float glass which usually has edge portions of inferior optical quality. The invention provides a particular apparatus to insure that the line along which the temperature is sensed is a desired distance from the glass edge and that the temperature sensing element is in heat conductive relation with the surface of the ribbon along the line of temperature measurement.

If the surface temperature of the glass ribbon along its edge portions is properly controlled, the ribbon can be subsequently cut easily, particularly along a line extending longitudinally of the ribbon path through the annealing lehr. Furthermore, controlling the rate at which the glass ribbon cools through the critical range of temperatures is a factor in controlling spontaneous breakage or splitting of the ribbon both longitudinally and laterally of its path of movement through the annealing lehr.

According to the present invention, it is possible to use glass temperature sensing means in heat conducting relation to the ribbon through heat conducting elements that contact the moving glass ribbon along a portion of said ribbon that would be wasted anyway without causing damage to the optical properties of the glass sheets that are subsequently cut away from the ribbon, a factor that discouraged the use of glass contacting temperature sensing means in the past.

The present invention provides means for detecting the temperature of the glass ribbon at a fixed distance adjacent each of the opposite longitudinal side edges thereof in the region where the ribbon cools through a critical temperature zone. The apparatus disclosed herein provides temperature sensing means disposed in heat-conducting relation with a surface of the ribbon and is supported by means that is in slidable relation with the ribbon surface. While such sliding relation has been avoided in the past, the present invention involves making such sliding contact along the edge portions of the ribbon that must be trimmed anyway, so that any surface marking resulting from such sliding contact does not harm the usable portion of the ribbon, yet the accurate temperature readings obtained can be correlated with the cooling rate of the usable portion of the ribbon.

A specific embodiment of this invention comprises glass edge engaging means including a freely rotating roll for each ribbon edge, means to urge said free running roll in yielding engagement against an adjacent edge of the glass ribbon, tube means for supporting therewithin a temperature sensing element and wires connected to said temperature sensing element.

The tube means has an inner end within the lehr, an outer end outside the lehr, and an intermediate portion supported by sleeve means. The latter is adjustably supported on a sleeve supporting means outside the lehr. The temperature sensing means is carried at the inner end portion of the tube means which is angled to rest parallel to a major surface of the glass ribbon in sliding contact over the portion of the ribbon laterally inward and adjacent the ribbon edge engaged by the free running roller of the glass edge engaging member to provide a line of temperature measurement parallel to the glass ribbon edge outside the longitudinal line along which the glass ribbon is cut after annealing is completed. Means is provided to urge the angled end extension of the inner end of the tube means into sliding relation against a major surface of the glass ribbon and additional means is provided to urge the rotating member in position to engage the edge of the glass ribbon while the end of the angled end of the extension of the inner end portion of the tube means is in sliding contact with the upper edge of the glass ribbon in the portion outside the area of the glass that is subsequently used.

BRIEF DESCRIPTION OF THE DRAWINGS

The present invention will be understood more clearly in the light of a description of a specific embodiment which follows.

In the drawings which form part of the description of the illustrative preferred embodiment and wherein like reference numbers refer to like structural elements.

DESCRIPTION OF THE PREFERRED EMBODIMENTS

Figure 1:
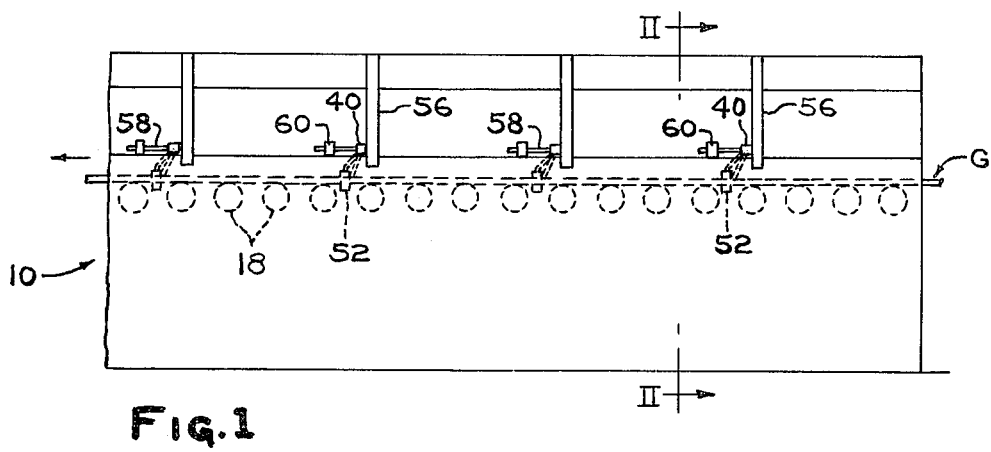
FIG. 1 is a fragmentary longitudinal view of a portion of an annealing lehr modified according to an illustrative embodiment of the present invention.
Figure 3:
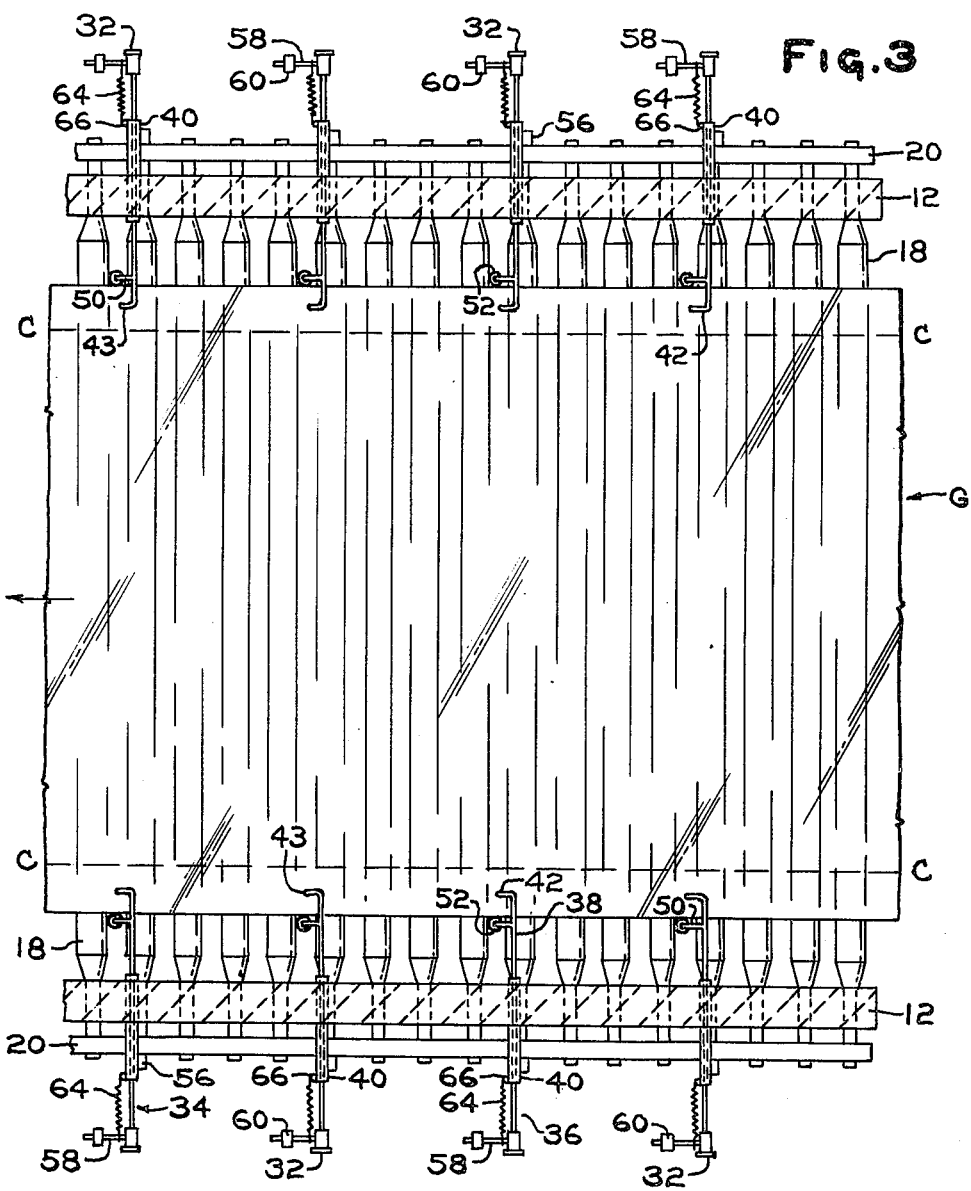
FIG. 3 is a plan view of the portion of the lehr disclosed in FIG. 1, with portions omitted for the sake of clarity.
Figure 2:
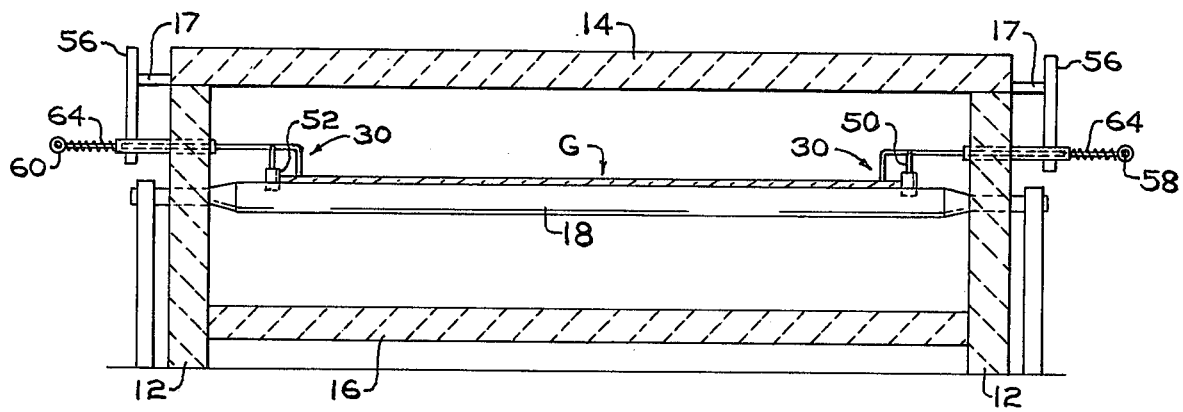
FIG. 2 is a fragmentary cross-sectional view along lines II—II of a portion of the lehr of FIG. 1.
Figure 4:
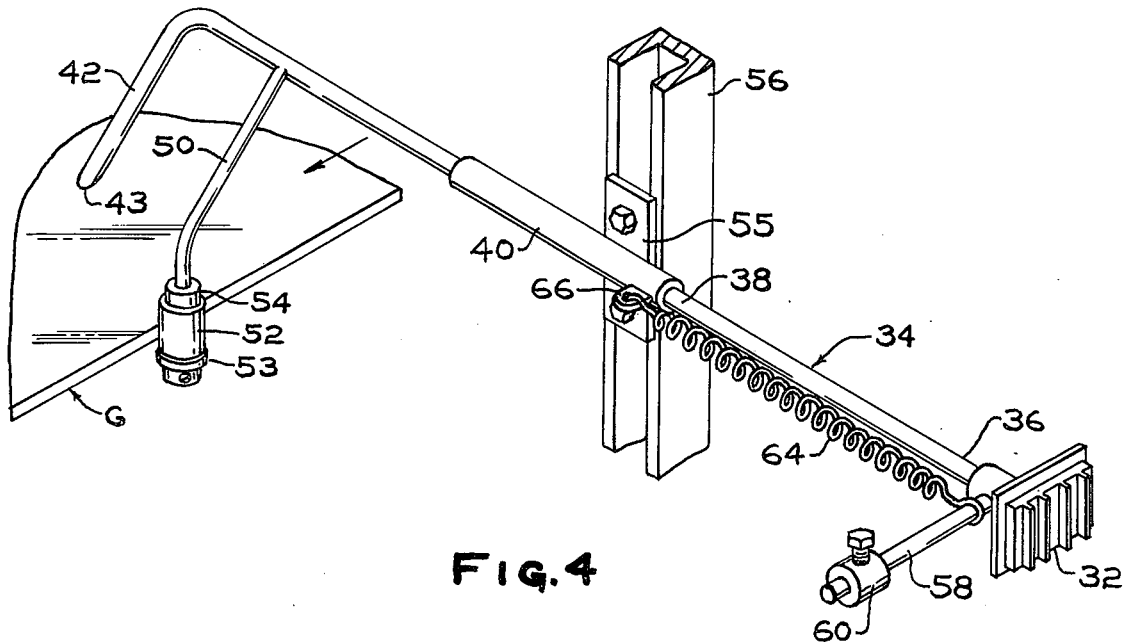
FIG. 4 is a detailed perspective view of essential elements of the glass temperature sensing mechanism conforming to the present invention.
Figure 5:
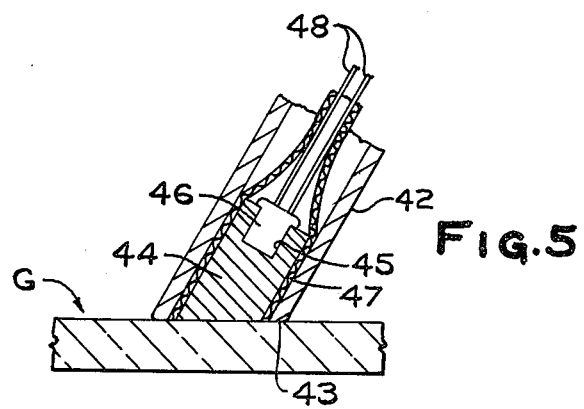
FIG. 5 is an enlarged sectional view of an end portion of tube means supporting a glass temperature sensing means according to the illustrative embodiment of the present invention.

Referring to the drawings, a portion of an annealing lehr 10 is shown comprising a pair of side walls 12 which extend longitudinally of the lehr in vertical planes and are interconnected by a horizontal roof 14 and a horizontal floor 16 reinforced by conventional metal reinforcing structure 17 outside the side walls 12. The side walls 12, roof 14 and floor 16 are made of material having suitable insulation properties so as to minimize the heat loss to the outside atmosphere. A continuous ribbon of glass G (to be cut after annealing along lines C—C to remove waste portions along the ribbon edges) is conveyed through the annealing lehr by means of a roller conveyor comprising a plurality of longitudinally spaced conveyor rolls 18, each extending transversely through apertures in the opposing longitudinal side walls 12 of the annealing lehr 10 and supported outside the side walls by bearing support brackets 20. Suitable driving means (not shown) is provided to rotate the conveyor rolls 18 in unison in a manner well known in the art.

Because of the importance of controlling the temperature of the glass ribbon as it cools through the annealing range and particularly the temperature range roughly from 540 degrees Centigrade to 430 degrees Centigrade, the illustrated embodiment of this invention provides four pairs of temperature sensing means 30 along this portion of the annealing lehr.

Each temperature sensing means comprises a terminal strip 32 having wires adapted to be connected to a temperature indicating device (not shown) which is supported on a viewing wall. Rigidly attached to the terminal strip and extending laterally inward thereof is tube means 34 comprising a stainless steel thermocouple sheath having its outer portion 36 rigidly attached to the terminal strip 32, an intermediate portion 38 extending through a sleeve 40 and an inner portion 42 turned at an angle with respect to the intermediate portion 38. The thermocouple sheath is tubular in construction and has its inner end 43 cut at an angle so that the end surface thereof is free to slide in the plane of the upper surface of the glass ribbon G as the latter passes the position occupied by the inner end 43 of the tube means 34. A heat conductive element in the form of a metal plug 44 is adhered to the innermost end 43 of the inner portion 42 and has a recess 45 spaced from inner end 43 that receives a thermocouple 46. An asbestos cloth soaked in sodium silicate is used as an adhesive 47 to adhere the metal plug 44 to the inner portion 42 of the tube means 34. Thermocouple wires 48 extend through the tube means 34 from the thermocouple 46 which is embedded in the metal plug 44 to the terminal strip 32. The end of metal plug 44 is coplanar with the obliquely extending end 43 of the tube means 34 so that the thermocouple 46 received in apertured portion 45 is in heat conducting relation to a major surface of the glass ribbon G.

A bent rod 50 slightly longer than the inner portion 42 of the thermocouple sheet 34 extends from the outer surface of the tube means 34 in a direction substantially parallel to the direction of inner portion 42 and has at its end portion a free running, thin walled, cylindrical roller 52 of a material that does not harm glass, such as stainless steel, rotatably supported about a sleeve bearing of boron nitride having an enlarged roller supporting end portion 53. The boron nitride sleeve surrounds an inner sleeve 54 of porcelain tubing, which surrounds rod 50. The free end of rod 50 is enclosed within a washer and is tapped to receive a screw that holds the enlarged end portion 53 in position relative to the rod 50.

The sleeve 40 is rigidly attached to a sleeve supporting bracket 55. The latter in turn is mounted on a support column 56 connected to structure 17 outside one or the other longitudinal side walls 12 of the annealing lehr. Means is provided to adjust the position of the sleeve supporting bracket 55 both vertically and horizontally relative to the support column 56 so as to adjust the vertical position of the sleeve 40 relative to the upper surface of the glass ribbon G. Adjusting the vertical position of the sleeve 40 along support column 56 enables the operator to insure that the oblique inner end 43 of tube means 34 is rotated into a plane parallel to the major surface of the glass ribbon G when there is a change in thickness of glass produced.

An opening is provided in the lehr side wall 12 for each temperature sensing means 30 through which the intermediate portion 38 of the tube means 34 extends. A radially extending arm 58 is rigidly attached to the outer portion 36 of the tube means 34 and has a weight 60 whose position is adjustable along the length of the radially extending arm 58 to control the rotating force to be applied to the tube means 34 to rotate the latter within sleeve 40 to an angular orientation limited to one where the inner end 43 of tube means 34 engages the upper surface of the glass ribbon in sliding relation thereto. Unless the vertical position of sleeve 40 along support column 56 is properly adjusted, the oblique inner end 43 of tube means 34 will not be parallel to the glass surface.

A tension spring 64 is interconnected between the radially extending arm 58 and a clamp 66 fixed to the outside of sleeve 40. The spring connection provides means to yieldingly urge the tube means 34 together with the bent rod 50 and the free running roller 52 laterally inward until roller 52 abuts yieldingly against the longitudinal edge of the glass ribbon while the weight 60 provides a rotating force causing the inner end 43 of the tube means 34 to make bearing contact against the upper surface of the glass ribbon that passes by the temperature sensing means 30. The metal plug 44 at the inner end 43 of tube means 34 insures that the thermocouple 46 is in heat conducting relation to the upper surface of the glass ribbon, thus insuring accurate and consistent temperature measurements by the thermocouple 46.

While the illustrative embodiment described herein shows four pairs of temperature sensing means disposed along the length of the critical portion of the path taken by the glass ribbon through the annealing lehr, it is understood that fewer or more temperature sensing means may be provided as required and may be used whenever desired in conjunction with a lehr for thermally treating a glass ribbon. Furthermore, it is understood that while the apparatus shows the use of thermocouples in heat conducting relation with the upper surface of the ribbon, it is also possible to rearrange the apparatus so that the lower surface of the ribbon is slidably contacted by the inner end of tube means 34 and have the temperature of the glass ribbon monitored continuously along a line inward of each longitudinally extending edge of the ribbon and outward of the line of ultimate cutting.

The form of the invention shown and described herein represents an illustrative preferred embodiment. It is understood that various changes may be made without departing from the gist of the invention as defined in the claimed subject matter which follows.

We claim:

1. Apparatus for determining the temperature, at a given station within a glass annealing lehr, of a moving glass ribbon along a line a given distance from an edge of said ribbon comprising a temperature sensitive element.
   tube means for supporting said temperature sensing element in heat conducting relation to said ribbon at said station and comprising an inner end within said lehr and an outer end outside said lehr,
   glass edge engaging means connected to said tube means within said lehr and constructed and arranged to enable said tube means to be in slidable relation to a surface of said ribbon said given distance from said edge when said glass edge engaging means engages said edge, and
   means urging said glass edge engaging means into yielding engagement with said edge of said ribbon.

2. Apparatus as in claim 1, further including sleeve means outside said lehr for supporting said tube means for rotational and axial movement relative thereto, and means biasing said tube means to rotate relative to said sleeve means into position wherein the inner end of said tube means is parallel to a surface of said ribbon.

3. Apparatus as in claim 2, wherein said urging means comprises a spring mounted outside said lehr between said means biasing said tube means and said sleeve means.

4. Apparatus as in claim 3, wherein said tube means has an inner end portion extending angularly from the main portion of said tube means, an end of said inner end portion extends obliquely of said inner end portion, further including sleeve support means attached to said sleeve, means to support said sleeve support means and means to lock said sleeve support means in a desired vertical position relative to said means to support said sleeve support means wherein said obliquely extending end is parallel to the upper surface of said ribbon.

5. Apparatus as in claim 4, wherein said end portion of said tube means contains a heat conducting element within said end portion of said tube means and having an end coplanar with the obliquely extending end of said tube means, said heat conducting element having a recess at the other end thereof for receiving a thermocouple in such a manner that said heat conducting element provides a continuous heat conducting path between said thermocouple and said major surface of said ribbon.

6. A method of treating a continuous glass ribbon having a main portion of acceptable optical quality flanked by edge portions of unacceptable optical quality comprising passing said ribbon past a series of temperature sensing stations in heat conducting relation to a temperature sensing element disposed adjacent and inward of each longitudinal side edge of the ribbon to provide sliding contact with one or the other edge portions wherein the quality of said ribbon is insufficient to provide glass sheets having acceptable optical properties and to determine the temperature of said ribbon at each of said temperature sensing stations,
   maintaining said temperature sensing element a fixed distance laterally inward of the edge of the ribbon less than the distance to said acceptable main portion, and cutting said ribbon edge portions of insufficient optical quality from said main portion.

7. A method as in claim 6, comprising providing said sliding contacts with said ribbon at locations where said ribbon edge portions have a temperature that is expected to be within an approximate temperature range of between 540° Centigrade and 430° Centigrade when the ribbon is annealed to assure relative ease in cutting.

* * * * *